US009602380B2

(12) United States Patent
Strassner

(10) Patent No.: US 9,602,380 B2
(45) Date of Patent: Mar. 21, 2017

(54) CONTEXT-AWARE DYNAMIC POLICY SELECTION FOR LOAD BALANCING BEHAVIOR

(71) Applicant: FutureWei Technologies, Inc., Plano, TX (US)

(72) Inventor: John Charles Strassner, San Jose, CA (US)

(73) Assignee: Futurewei Technologies, Inc., Plano, TX (US)

( * ) Notice: Subject to any disclaimer, the term of this patent is extended or adjusted under 35 U.S.C. 154(b) by 223 days.

(21) Appl. No.: 14/229,640

(22) Filed: Mar. 28, 2014

(65) Prior Publication Data

US 2015/0281339 A1  Oct. 1, 2015

(51) Int. Cl.
 *H04L 29/08* (2006.01)
 *H04L 12/26* (2006.01)
 (Continued)

(52) U.S. Cl.
 CPC .......... *H04L 43/0888* (2013.01); *G06F 9/505* (2013.01); *H04L 41/0893* (2013.01);
 (Continued)

(58) Field of Classification Search
 CPC .......................... H04L 43/0888; H04L 67/101
 (Continued)

(56) References Cited

U.S. PATENT DOCUMENTS 7,464,145 B2   12/2008   Strassner
7,542,956 B2   6/2009   Strassner et al.
(Continued)

FOREIGN PATENT DOCUMENTS

KR     100642998 B1    10/2006
WO    2004008283 A2    1/2004
(Continued)

OTHER PUBLICATIONS

"Operations, Administration, Maintenance, and Provisioning (OAM &P) Security Requirements for the Public Telecommunications Network: A Baseline of Security Requirements for the Management Plane"—NSTAC, Aug. 2003 https://www.dhs.gov/sites/default/files/publications/Operation%20Admin%20Maint%20and%20Provisioning%20Report%20(October%202003)_0.pdf.*

(Continued)

*Primary Examiner* — Randy Scott
(74) *Attorney, Agent, or Firm* — Slater Matsil, LLP

(57) ABSTRACT

Dynamically updating load balancing policies based on operations, administration, maintenance, and provisioning (OAMP) data generated by a load balancing network may provide increased load balancing performance. As an example, an existing set of load-balancing policies can be dynamically modified based on OAMP data generated by load balancers and/or network elements. As another example, new load-balancing policies can be dynamically created based on the OAMP data. As yet another example, an updated set of load-balancing policies can be selected from a pool of policies based on OAMP data. Dynamically updating load balancing policies can be achieved using information model processing frameworks, such as the next generation directory enabled networks (DEN-ng) model.

27 Claims, 12 Drawing Sheets

(51) Int. Cl.
*G06F 9/50* (2006.01)
*H04L 12/24* (2006.01)

(52) U.S. Cl.
CPC ...... *H04L 67/1025* (2013.01); *H04L 41/0886* (2013.01); *H04L 43/0817* (2013.01)

(58) Field of Classification Search
USPC .......... 709/223, 224, 225, 226, 227
See application file for complete search history.

(56) References Cited

U.S. PATENT DOCUMENTS

| | | | |
|---|---|---|---|
| 7,558,847 | B2 | 7/2009 | Strassner |
| 8,010,650 | B2 | 8/2011 | Strassner |
| 8,019,838 | B2 | 9/2011 | Jiang et al. |
| 8,078,553 | B2 | 12/2011 | Strassner et al. |
| 8,195,827 | B2 | 6/2012 | Strassner |
| 8,327,414 | B2 | 12/2012 | Strassner et al. |
| 8,374,102 | B2 * | 2/2013 | Luft ............ H04L 41/5067 370/253 |
| 2004/0230681 | A1 | 11/2004 | Strassner et al. |
| 2006/0015625 | A1 | 1/2006 | Ballinger et al. |
| 2007/0288419 | A1 | 12/2007 | Strassner |
| 2007/0288467 | A1 | 12/2007 | Strassner et al. |
| 2008/0059613 | A1 | 3/2008 | Strassner |
| 2008/0071714 | A1 | 3/2008 | Menich et al. |
| 2008/0126287 | A1 | 5/2008 | Cox et al. |
| 2008/0161941 | A1 | 7/2008 | Strassner et al. |
| 2008/0162109 | A1 | 7/2008 | Strassner et al. |
| 2008/0271022 | A1 | 10/2008 | Strassner et al. |
| 2008/0271111 | A1 | 10/2008 | Cox et al. |
| 2008/0291923 | A1 * | 11/2008 | Back ................ H04L 45/04 370/396 |
| 2008/0316972 | A1 | 12/2008 | Shaheen |
| 2009/0164499 | A1 | 6/2009 | Samudrala et al. |
| 2009/0165078 | A1 | 6/2009 | Samudrala et al. |
| 2009/0327172 | A1 | 12/2009 | Liu et al. |
| 2009/0328133 | A1 | 12/2009 | Strassner et al. |
| 2013/0054809 | A1 * | 2/2013 | Urmanov ............ G06F 9/505 709/226 |
| 2015/0222702 | A1 * | 8/2015 | Salle ............ G06F 9/4856 709/201 |
| 2015/0281339 | A1 | 10/2015 | Strassner |
| 2015/0304234 | A1 | 10/2015 | Salle et al. |

FOREIGN PATENT DOCUMENTS

| | | |
|---|---|---|
| WO | 2007143259 A2 | 12/2007 |
| WO | 2007146463 A2 | 12/2007 |
| WO | 2008024539 A2 | 2/2008 |
| WO | 2008082763 A2 | 7/2008 |
| WO | 2008082771 A1 | 7/2008 |
| WO | 2008134273 A1 | 11/2008 |
| WO | 2009002697 A1 | 12/2008 |
| WO | 2009158462 A2 | 12/2009 |

OTHER PUBLICATIONS

International Search Report and Written Opinion received in International Application No. PCT/CN2015/075003 mailed Jun. 17, 2015, 12 pages.
3GPP, 3rd Generation Partnership Project; Technical Specification Group Core Network and Terminals; Technical realization of the Short Message Service (SMS) (Release 12). 3GPP TS 23.040 V12.2.0 Technical Specification, (Dec. 2013), 209 pages.
Desai, J., et al., "Architecting OSB for High Availability and Whole Server Miration," Oct. 2009, 49 pages.
IBM, "Load Balance Administration Guide," WebSphere Application Server, Version 6.1, IBM Corp., May 2006, 501 pages.
IBM, "Load Balancing IBM WebSphere Servers with F5 Networks BIG-IP System," (date unknown), 15 pages.
"Quick Start Guide," Apache ServiceMix, Version 5.0.0—Snapshot, Retrieved Nov. 2012, 14 pages.
Red Hat, "JBoss Fuse Apache CXF Development Guide (Draft)," Version 6.1, Dec. 2013, 760 pages.
TIBCO, "TIBCO Administrator Server Configuration Guide," Software Release 5.7.1, Mar. 2012, 297 pages.

* cited by examiner

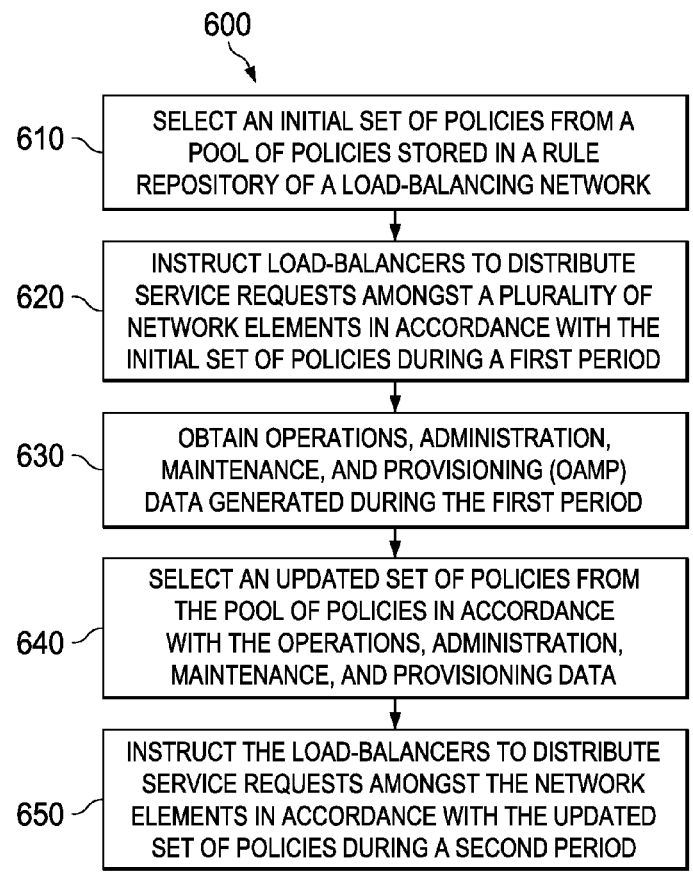
FIG. 6
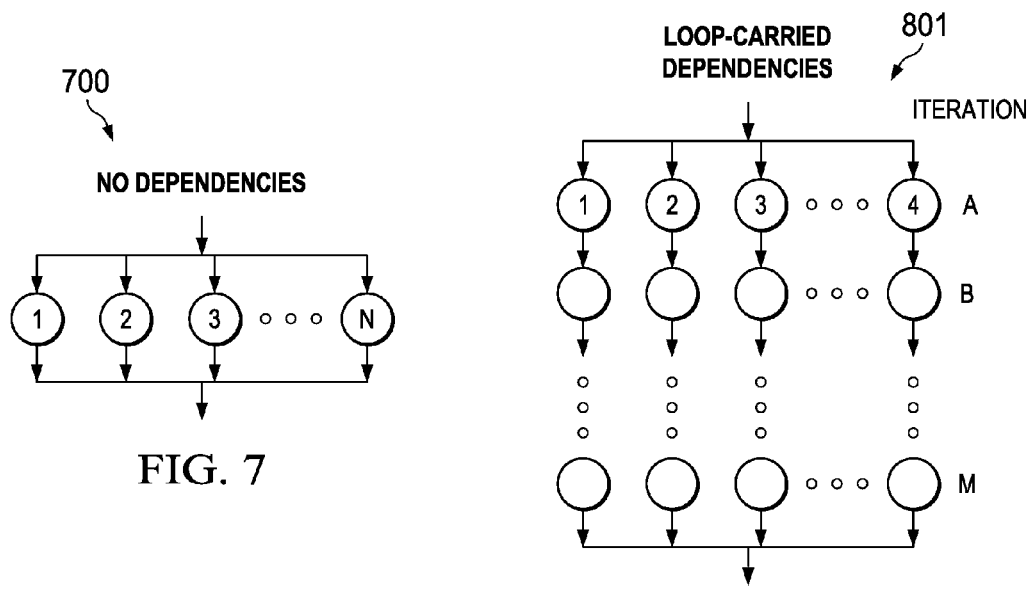
FIG. 7
FIG. 8A

FIG. 14

| | F5 LOAD BALANCING | IBM WebSphere | ORACLE WebLogic | TIBCO RENDEVOUS | APACHE ServiceMix | EMBODIMENT |
|---|---|---|---|---|---|---|
| LEAST NUMBER OF CONNECTIONS | ✓ | | | | | ✓ |
| LEAST HEAVILY LOADED | ✓ | ✓ | | | | ✓ |
| FASTEST RESPONSE TIME | ✓ | ✓ | | | ✓ | ✓ |
| CONTENT (URL, OBJ, ETC) BASED | ✓ | ✓ | ✓ | | | ✓ |
| MAC FORWARDING, NAT/NAPT FORWARDING | | ✓ | | | | |
| ROUND-ROBIN | ✓ | ✓ | ✓ | | ✓ | ✓ |
| WEIGHTED ROUND-ROBIN | ✓ BOTH | ✓ MONITORED | ✓ PREDEFINED | | ✓ PREDEFINED | ✓ |
| RANDOM | | | ✓ | | ✓ | ✓ |
| WEIGHTED RANDOM | | | | | ✓ | ✓ |
| STICKY | ✓ | ✓ | ✓ | | ✓ | ✓ |
| FAILOVER | ✓ | ✓ | ✓ | ✓ SEMI | | ✓ |
| HEALTH MONITOR | ✓ | ✓ METRIC SERVER | | | | ✓ |
| METRICS FOR DETERMINING LOAD BALANCING ALGORITHM CAN BE CHOSEN DYNAMICALLY | | | | | | ✓ |
| POLICY-BASED CONTROL TO DYNAMICALLY ADJUST METRICS | | | | | | ✓ |
| CONFIGURABLE NODE-BASED HEALTH MONITORING | | | | | | ✓ |
| EXTENSIBLE METRICS (FREE TO ADD NEW OR EDIT EXISTING METRICS) | | | | | | ✓ |

CONTEXT-AWARE DYNAMIC POLICY SELECTION FOR LOAD BALANCING BEHAVIOR

TECHNICAL FIELD

The present invention relates generally to computer networks, and in some embodiments, to context-aware dynamic policy selection for load balancing behavior.

BACKGROUND

Load balancing can be used to distribute workloads across network resources (e.g., links, processing units, servers, etc.) in a manner that improves resource utilization and performance. For example, load balancing over multiple components can improve reliability (e.g., through redundancy) when compared to single component operation. Traditional load balancing techniques rely on statically defined policies to distribute workloads across resources, and consequently may be unable to compensate for, or adapt to, changing network conditions. Such inflexibility may prevent conventional load balancers from fulfilling the demands of large-scale and multi-tenancy platforms, such as data centers and cloud computing service networks. Accordingly, techniques that provide flexible, scalable, and customizable load balancing are desired to achieve efficient and robust distribution of services for diverse applications.

SUMMARY OF THE INVENTION

Technical advantages are generally achieved, by embodiments of this disclosure which describe context-aware dynamic policy selection for load balancing behavior.

In accordance with an embodiment, a method for dynamically adjusting load balancing behavior is provided. In this example, the method includes instructing load-balancers to distribute service requests amongst a plurality of network elements in accordance with an initial set of policies during a first period, obtaining operations, administration, maintenance, and provisioning (OAMP) data generated during the first period, and obtaining an updated set of policies in accordance with the OAMP data collected, the updated set of policies reflecting the nature of the OAMP data collected. The method further includes instructing the load-balancers to distribute service requests amongst the network elements in accordance with the updated set of policies during a second period. An apparatus for performing this method is also provided.

In accordance with another embodiment, a load-balancing network is provided. In this example, the load balancing network comprises a rule repository configured to store a pool of load-balancing policies, and a plurality of load-balancers configured to distribute service requests amongst network elements in accordance with a set of load-balancing policies. The set of load-balancing policies includes load-balancing policies selected from the pool of load-balancing policies stored in the rule repository. The load-balancing network further includes a context-aware policy manager configured to dynamically update the set of load-balancing policies in accordance with operations, administration, maintenance, and provisioning (OAMP) data generated by the load balancers, the network elements, or both.

BRIEF DESCRIPTION OF THE DRAWINGS

For a more complete understanding of the present disclosure, and the advantages thereof, reference is now made to the following descriptions taken in conjunction with the accompanying drawings, in which:

FIG. 6 illustrates a flowchart of an embodiment load balancing method;

FIG. 7 illustrates a graph of independent network elements;

FIGS. 8A-8C illustrate graphs of load dependencies between dependent network elements;

FIG. 14 illustrates a chart for comparing embodiment load balancing solutions with conventional solutions.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

The making and using of embodiments of this disclosure are discussed in detail below. It should be appreciated, however, that the concepts disclosed herein can be embodied in a wide variety of specific contexts, and that the specific embodiments discussed herein are merely illustrative and do not serve to limit the scope of the claims. Further, it should be understood that various changes, substitutions and alterations can be made herein without departing from the spirit and scope of this disclosure as defined by the appended claims.

Disclosed herein are techniques for dynamically updating load balancing policies based on operations, administration, maintenance, and provisioning (OAMP) data generated by a load balancing network. In some embodiments, existing load-balancing policies are dynamically modified based on OAMP data generated by load balancers and/or network elements. In other embodiments, new load-balancing policies are dynamically created based on the OAMP data. In yet other embodiments, an updated set of load-balancing policies are selected from a pool of policies based on OAMP data. Dynamically updating load balancing policies can be achieved using information model processing frameworks, such as the next generation directory enabled networks (DEN-ng) model. Indeed, aspects of this disclosure provide an extension to the DEN-ng model that allows new load balancing policies and metrics to be dynamically defined.

Various events may trigger the creation of new load balancing policies and metrics, such as adding new load balancers and/or network elements to the network, receiving new load balancing instructions, etc. These and other aspects are described in greater detail below.

Figure 1:
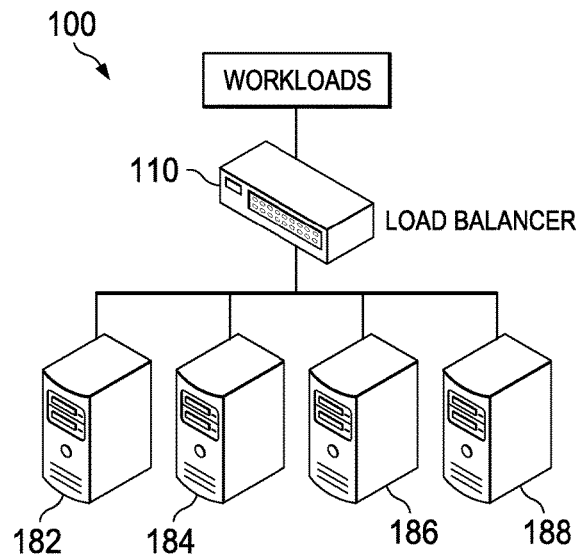
FIG. 1 illustrates a diagram of a conventional load balancing network.

FIG. 1 illustrates a load balancing network 100 comprising a load balancer 110 and network elements 182-188. The load balancer 110 distributes workloads to network elements 182-188, which provide resources and/or services based on the distributed workloads. The load balancer 110 includes any component (e.g., hardware, software, or combinations thereof) that distributes workloads based on load balancing policies. The network elements 182-188 can include any components (e.g., hardware, software, or combinations thereof) configured to perform or satisfy workloads. In some embodiments, the workloads may be service requests, and the network elements 182-188 may provide services, or resources, to satisfy the service requests based on the workload distribution.

Figure 2:
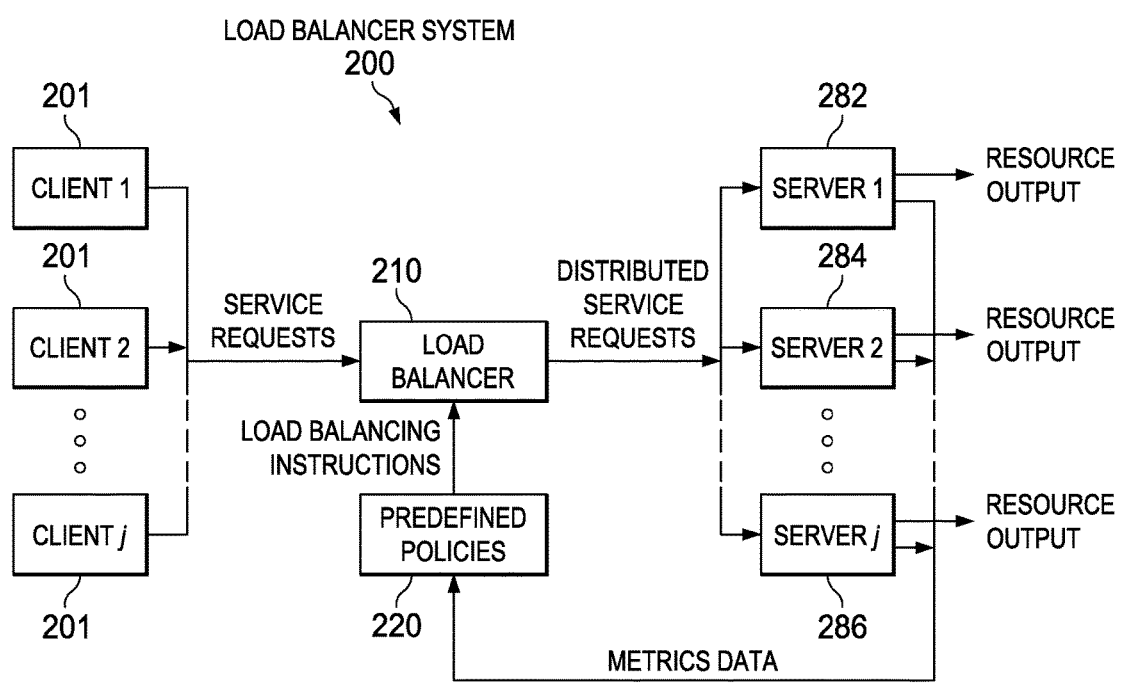
FIG. 2 illustrates a diagram of another conventional load balancing network.

Traditional load balancing networks distribute workloads in accordance with statically pre-defined policies. FIG. 2 illustrates a conventional load balancing network 200 in which a load balancer 210 receives service requests from clients 201, and distributes those service requests to servers 282-288 in accordance with statically defined load balancing policies 220. The statically defined load balancing policies 220 may govern load balancing operations that are related to the function of performance metrics of the servers 282-288. For example, the load balancing policies 220 may specify that (1) if all the servers are operating normally, then service requests are equally distributed amongst the servers 282-288; and (2) if a server becomes overloaded, then a percentage of service request distributions is shifted from the overloaded server to the normally operating servers at a given rate until the overloaded server is no longer overloaded.

Notably, while operation of the load balancer 210 may vary based on performance metrics, the statically-defined load balancing policies 220 remain unchanged during runtime operation of the load balancing network 220. This may be dis-advantageous for a variety of reasons, as the pre-defined policies 220 may be incapable of projecting contingencies and/or may be unable to account for new needs from the network. For example, the statically defined load balancing policies 220 may not account for a situation in which all of the servers 282-288 become overloaded.

Figure 3:
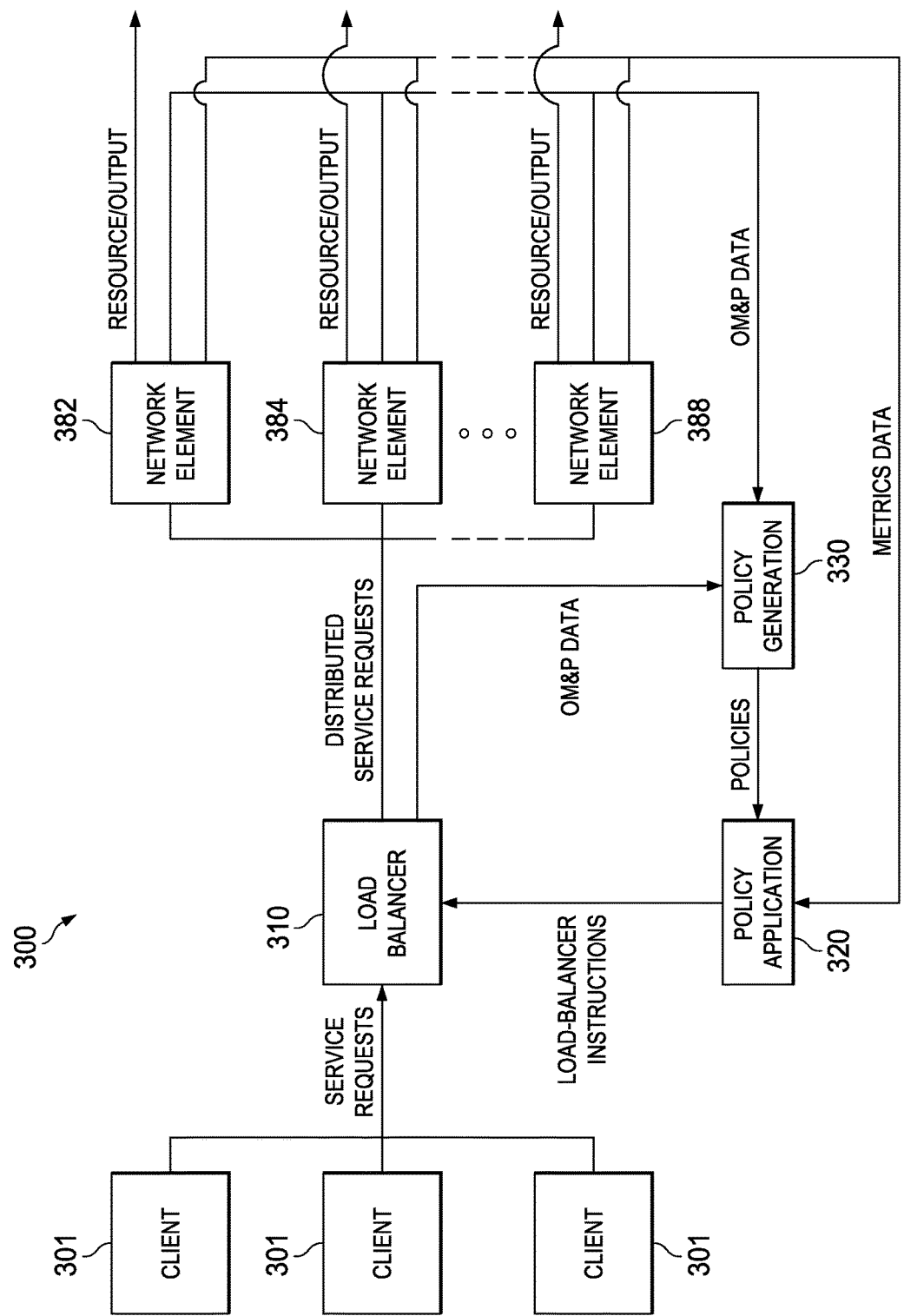
FIG. 3 illustrates a diagram of an embodiment load balancing network.

Aspects of this disclosure allow the generation of new load balancing policies based on OAMP data obtained from load balancers and/or network elements. FIG. 3 illustrates an embodiment load balancing network 300 in which a load balancer 310 receives service requests received from clients 301, and distributes those service requests to network elements 382-388 based on dynamically defined policies applied by the policy application module 320. The policy application module 320 may apply the policies as a function of performance metrics provided by the network elements 382-388. Moreover, the policies themselves may be dynamically created by the policy generation module 330 based on OAMP data generated by the load balancer 310 and/or the network elements 382-388. This allows both the load balancing behavior, as well as the policies that govern that behavior, to be dynamically adjusted to suit changing network conditions.

Figure 4:
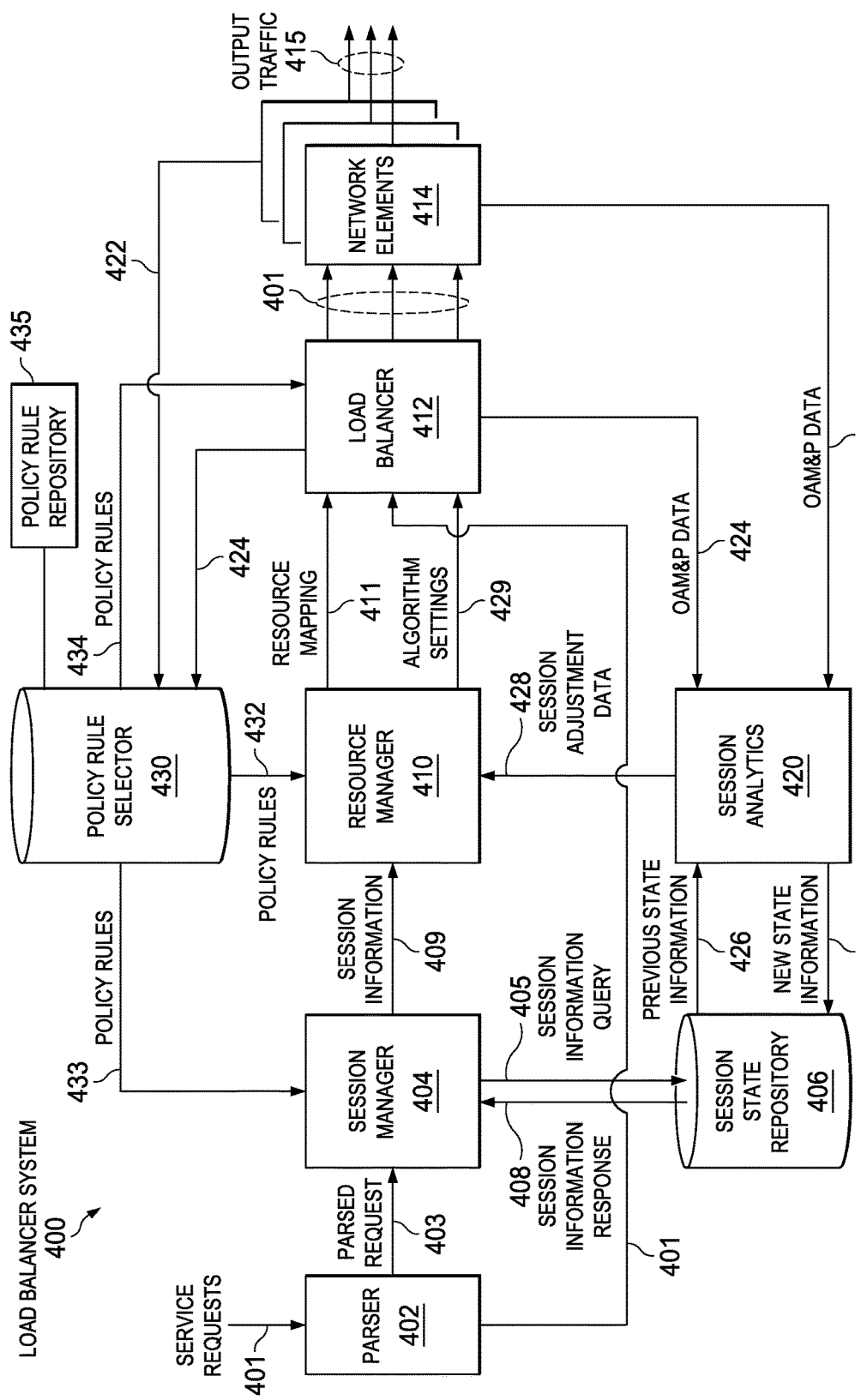
FIG. 4 illustrates a diagram of another embodiment load balancing network.

FIG. 4 illustrates another embodiment load balancing network 400. As shown, service requests 401 are parsed by the parser 402 prior to being forwarded to the load balancer 412. The load balancer 412 distributes the service requests 401 to the network elements 414, where the service requests 401 are processed into output traffic 415. The manner in which the service requests 401 are distributed by the load balancer 412 is influenced by policies and adjustments provided by the load balancer system 400.

Specifically, the parser 402 analyzes the service requests 401 to obtain parsed request information 403, which is forwarded to the session manager 404. The parser 402 may use various techniques for parsing the service requests 401. In one embodiment, the parser 402 uses a markup language (e.g., Extensible Markup Language (XML)) to map the service requests 401 into parsed request information 403. Other computer-oriented languages can also be used to generate the parsed request information 403, such as Knowledge Interchange Format (KIF) language, etc.

The Session Manager 404 examines the parsed request information 403 to determine whether it belongs to an existing session, in which case parameters associated with the existing session can be utilized to more efficiently load balance the parsed request. Specifically, the session manager 404 may send a session information query to a session state repository 406 that includes information relating to session information of the service request 401. The session state repository 40 may return a session information response 408 to the session manager 404 specifying whether or not the service request 401 is associated with an existing session, and if so, identification information for the associated existing session. As noted above, determining whether a new service request is associated with an existing session can be allow more efficient and/or streamlined load balancing of the new service request. For example, it may be beneficial (from a network perspective) to balance requests associated with the same session in a similar manner, e.g., apply same quality of service (QoS) restriction, use same balancer and/or network element, etc. New service requests are generated for existing session in a variety of contexts. For example, a previous HTTP request may spawn a subsequent HTTP request when a user clicks on an object(s) attached to a uniform resource identifier (URI).

The session manager 404 then sends session information 409 to the resource manager 410. The session information 409 may indicate various information relating to the service request, including (for example) whether the parsed request is associated with an existing session, etc. The resource manager 410 then creates a new session for the service request 401, or otherwise associates the service request 401 with an existing session, and proceeds to map the service request 401 to one or more load balancers 412 using a mapping algorithm. This mapping is communicated to the load balancers 412 via the resource mapping instructions 411. The corresponding load balancer 412 then distributes the service request 401 to one or more network elements 414 based on policy rules 434 and algorithm settings 429 provided by the policy rule selector 430 and the resource manager 410, respectively.

Notably, the policy rules 432-434 govern operations of the resource manager 410, session manager 404, and the load balancers 412, respectively. The policy rule selector 430 selects the policy rules 432-434 from a policy rule repository 435 based on Operational, Administrative, Management, and Performance (OAMP) data 422, 424 collected from the network elements 414 and the load balancers 412. Different amounts and/or types of OAMP data 422, 424 may be collected from different network elements 414 and/or load balancers 412. In some embodiments, a DEN-ng model is used to define how each of the collected OAMP data types relates to one another. The OAMP data 422, 424 is also analyzed by the session analytics module 420, which tracks current loading data for each of the network elements 414 and load balancers 412. The session analytics module 420 uses the OAMP data 422, 424, along with previous state information 426 from the session state repository 406, to produce new state information 427 and session adjustment data 428. The new state information 427 is inferred or derived from the OAMP data 422, 424, and is used to update previous state information in the session state repository 406. The session adjustment data 426 can include various data (e.g., existing data, time-sensitive data, etc.) and/or guidelines that are used by the resource manager 410 to adjust settings of load balancer algorithms, which is achieved through communication of the algorithm settings 429. In some embodiments, the resource manager 410 adjusts the load balancer algorithms in order to balance workloads of different clients as a function of the client's context. For example, the algorithm settings 429 may change queue parameters or introduce a new type of queue or scheduler.

The policy rules 432, 433, and 434 may be adjusted dynamically in order to adapt the behaviors of the resource manager 410, session manager 404, and load balancer 412 according to a current context. Advantageously, this allows global or local system objectives to be translated into policies that define load balancing behavior and coordinate operations of the resource manager 410, session manager 404, and load balancer 412, thereby improving overall load balancing performance through, inter alia, synchronization of the resource manager 410, session manager 404, and load balancers 412.

In some implementations, two or more of the resource manager 410, session manager 404, and load balancer 412 will use different command languages and/or user interfaces. In such cases, context-aware policy selection techniques may use an information model system architecture (e.g., DEN-ng or otherwise) to map the syntax and semantics of the different commands to each other, which will offer increased interoperability and reduced translation related processing when compared to techniques relying on no model, or on data model architectures. Moreover, implementation of the information model system architecture may allow capabilities of the resource manager 410, session manager 404, and load balancer 412 to be mapped to system-wide objectives, thereby allowing high-level technology/vendor neutral goals to be translated into lower-level vendor-specific commands.

Figure 5:
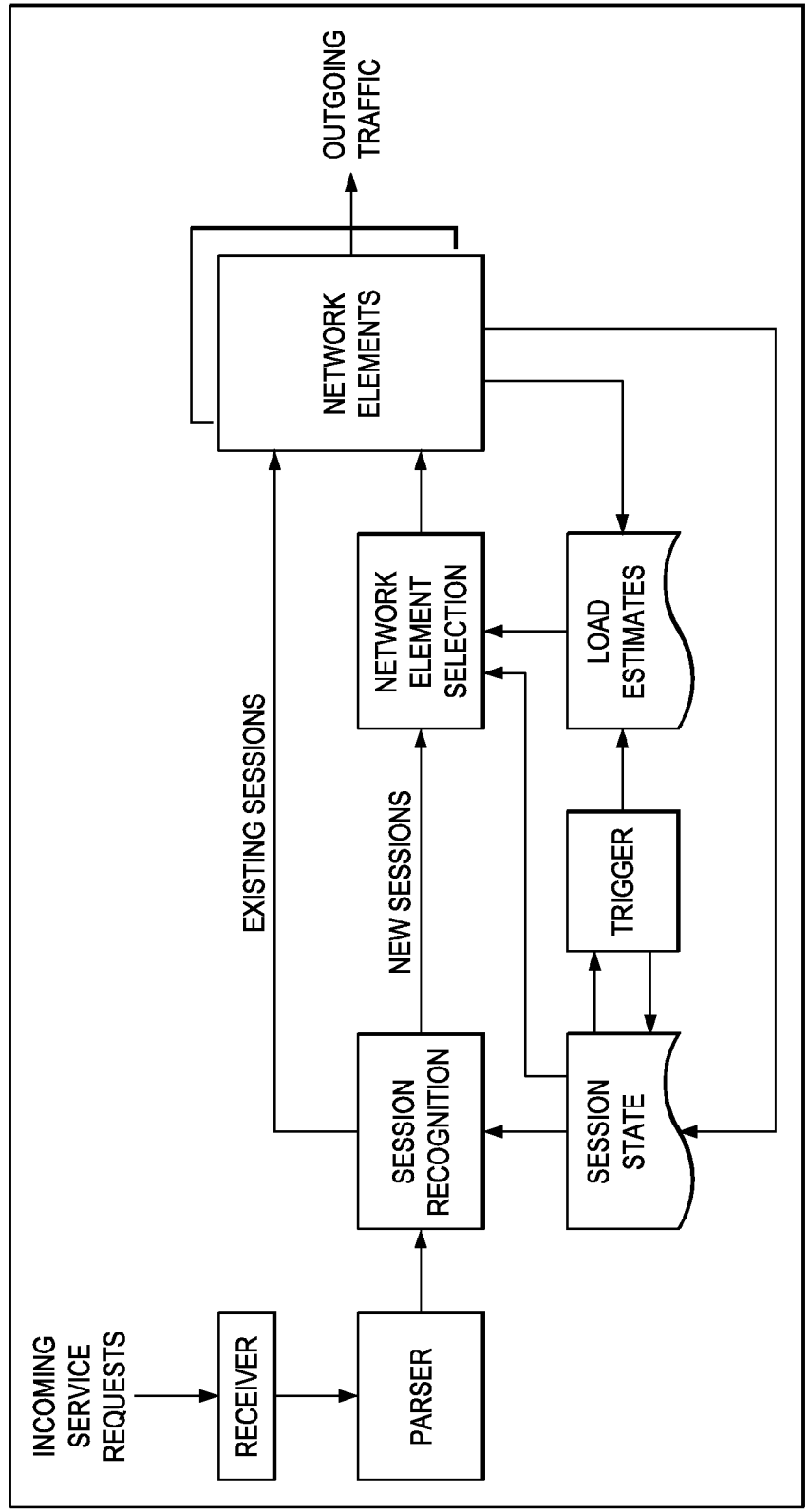
FIG. 5 illustrates a diagram of a work-flow for an embodiment load balancing network.

FIG. 5 illustrates a work-flow 500 of the load-balancer architecture 400. As shown, an incoming service request is parsed and analyzed in order to determine whether the service request is associated with an existing session based on session state information. If the service request is associated with an existing session, then the service request can be handled using load balancing settings corresponding to the existing session. For instance, the new service request may be distributed to the same network element(s) assigned to process previous requests of the existing session. Conversely, if the service request is not associated with an existing session, then a new session is created, and the load balancing system selects load balancing settings for the new session. The load balancing settings include service request mapping guidelines based on load estimations for the request, e.g., processing/network costs required to satisfy the service request. The service request is then forwarded/distributed to the network elements in accordance with load balancing settings, where the request is processed into outgoing traffic.

Aspects of this disclosure provide techniques for dynamically adjusting load balancing behavior based on OAMP data. FIG. 6 illustrates a method 600 for adjusting load balancing behavior, as may be performed by a context-aware policy manager. As shown, the method 600 begins with step 610, where context-aware policy manager selects an initial set of policies from a pool policy stored in a rule repository of a load balancing network. Subsequently, the method 600 proceeds to step 620, where the context aware policy manager instructs load balancers to distribute service requests among a plurality of network elements in accordance with the initial set of policies during a first period. Next, the method 600 proceeds to step 630, where the context aware policy manager obtains OAMP data generated during the first period. The OAMP data may be generated from the load balancers, the network elements, or both. Thereafter, the method 600 proceeds to step 640, where the context aware policy manager selects an updated set of policies from the pool of resource policies that apply to the OAMP data. Subsequently, the method 600 proceeds to step 650, where the context aware policy manager instructs the load balancers distribute service requests among the network elements in accordance with the updated set of policies during a second period.

Load balancing techniques described herein can use information model and data model frameworks to achieve context-aware policy selection. Information models typically use abstraction to model entities in a managed environment, and can define relationships between entity attributes and operations based on policy rules, which can be selected based on a context of the entity or system. Comparatively, a data model is a concrete implementation of an information model in terms appropriate to a specific type of repository that uses a specific access protocol or protocols. The data model can include data structures, operations, and rules that define how the data is stored, accessed and manipulated. In addition, the advantage of using information model frameworks is that multiple data models can be harmonized by defining the terminology, concepts, and data of the information model to be the "master data". As such, the master data can be used to harmonize and reconcile differences in definition, format, and other aspects of different data models that are describing the same or similar concepts.

In some load balancer systems, network elements may operate independently, and consequently may not share any dependencies. FIG. 7 illustrates a graph of a network load balancer system comprising network elements that share no dependencies. More often, however, network elements in a load balancing system perform related processing tasks, and as a result, the operation of one network element is dependent the operation of another network element. By way of example, a system including storage, memory, and processors may require that a programming instruction be read from storage into memory before the processor can perform a given task. Hence, the processor's performance of tasks is dependent on reading the programming instruction for the storage to the memory, and is consequently affected by, inter alia, efficiency of storage and memory operations, e.g., time required to find the instruction in storage database, etc. This relationship may be referred to as a "must finish first" dependency, where processing at a first node must be completed before processing at a second node can begin. Must finish first dependencies are typically demonstrated by an arrow from the first node to the second node.

Figure 8B:
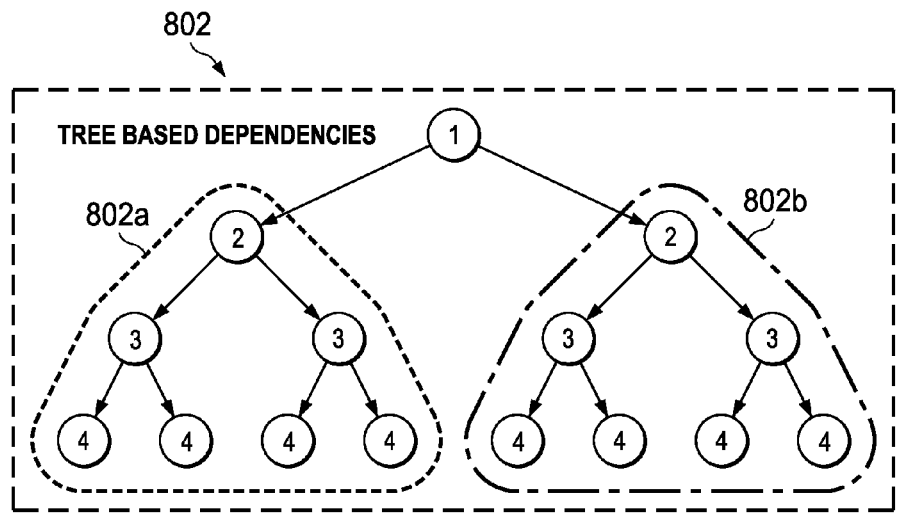
Figure 8C:
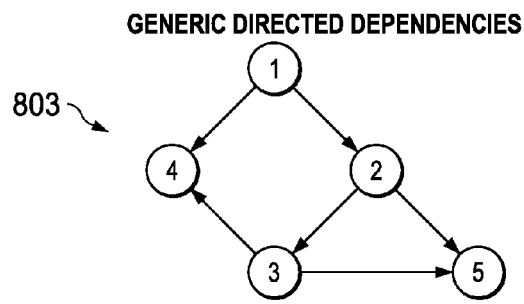

Aspects of this disclosure provide techniques for modeling dependency relationships between network elements of load balancing network. FIGS. 8A-8C illustrate graphs of dependency relationships 801, 802, 803 between network elements in a load balancing network. While other dependency relationships may exists, the dependency relationships 801, 802, 803 may account for approximately ninety percent of dependencies encountered in embodiment load balancing systems. Each graph defines different ways that objects depend on each other. Typically, for each graph 801, 802, 803, nodes represent tasks, and edges represent dependencies. Dependency relationship 801 demonstrates a loop-carried dependency relationship, where dependencies are present within iterations of a task, but not between tasks. Dependency relationship 802 demonstrates a tree-based dependency relationship, where lower-tier tasks are dependent on higher tier tasks, but where tasks on a common tier can be performed independently. Consequently, sub-tree 802a can be performed in parallel with the sub-tree 802b. Dependency relationship 803 demonstrates a directed acyclic graph dependency relationship, where inter-dependent tasks are those tasks that do not have a directed dependency cycle. As shown, node 1 depends on nodes 2 and 4, node 2 depends on nodes 3 and 5, node 3 depends on nodes 4 and 5, and nodes 4 and 5 are terminal nodes.

Figure 9:
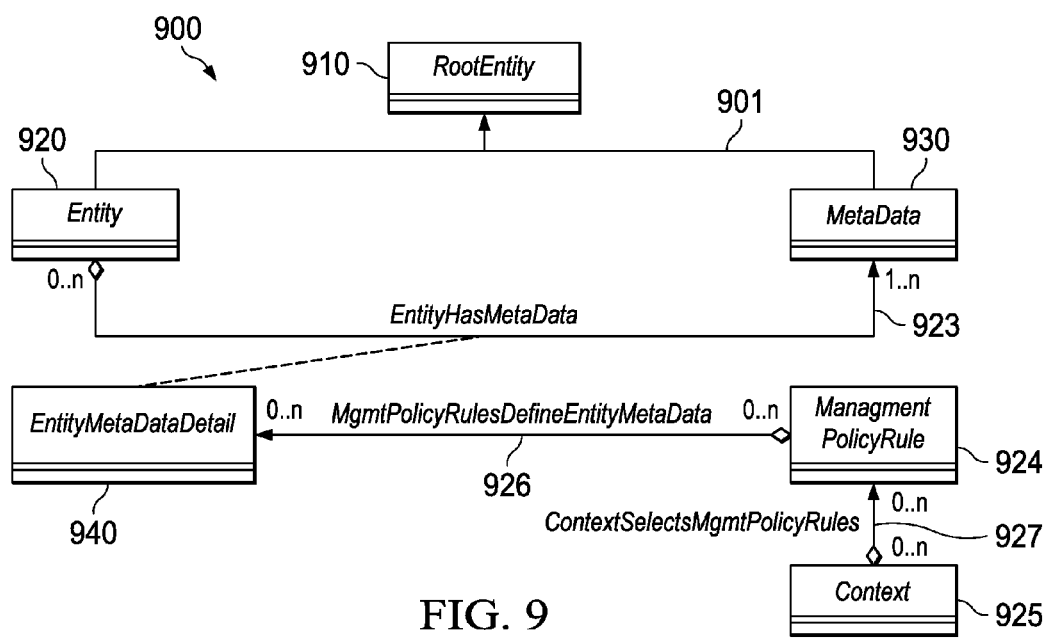
FIG. 9 illustrates a class diagram for relating entities to metadata using the DEN-ng model.
Figure 10:
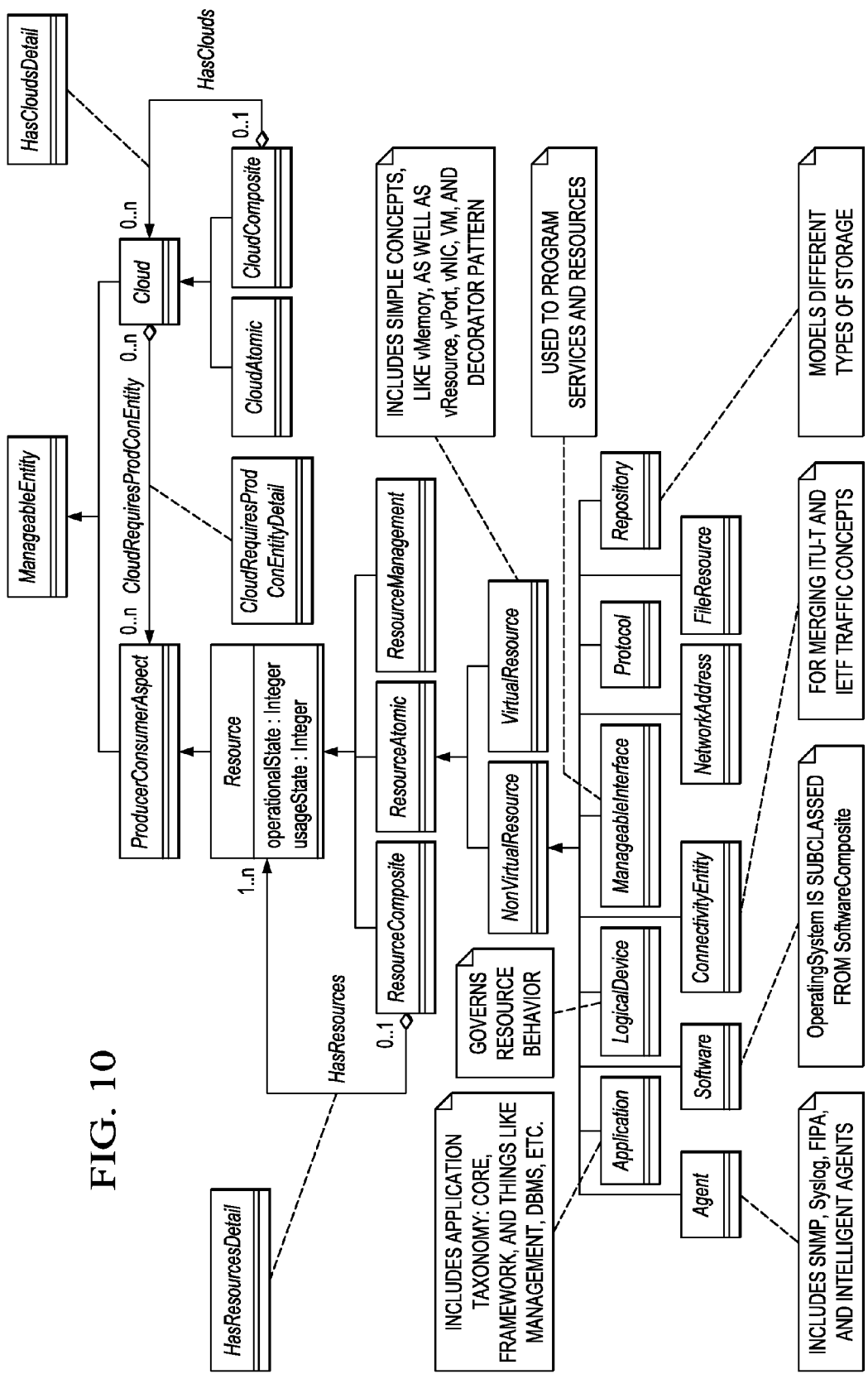
FIG. 10 illustrates a diagram for relating non-virtual resource to virtual resources using the DEN-ng model.

Aspects of this disclosure provide an extension to the DEN-ng policy information model that allows new load balancing policies and metrics to be dynamically defined. DEN-ng allows policy rules to be represented by various components, including metadata, event clauses, condition clauses, and action clauses. FIG. 9 illustrates a class diagram 900 for relating entities to metadata using the DEN-ng model. As shown, the class diagram 900 includes a root entity 910, an entity 920, and a metadata 930 which are interrelated via relationships. The root entity 910 is the top of the DEN-ng class hierarchy, and includes properties that enable naming, description, and identification of all objects (manageable and unmanageable) in the environment. Entity 920 and metadata 930 are subclasses of root entity 910, and are therefore related to root entity 910 via an inheritance relationship 901. According to the DEN-ng model, any subclass inherits the attributes and relationships of its superclass. For example, entity 920 and metadata 930 inherit the attributes and relationships of root entity 910. Entity 920 relates to metadata 930 via an aggregation relationship 923, which allows the entity 920 to be associated with a portion of the metadata 930. Which portion of the metadata 930 is associated with the entity 920 depends on the entitymetadatadetail 940 as defined by a selection of policies specified by the management policy rule object 924. The policies are selected based on the context 925. Thus, by manipulating the context 925, new policy rules can be implemented to control the relationship between entity 920 and metadata 930. Put another way, the aggregation 923 is more than a simple set of pointers that tells the system that Entity aggregates MetaData and MetaData is a part of Entity, but rather is realized as an association class that enables portions of different types of MetaData to be aggregated by the Entity for different contexts. An association class may allow the semantics of the aggregation to be defined by the entitymetadatadetail class. Hence, the aggregation mgmtpolicyrulesdefineentitymetadata 926 can be used to change the values of attributes and/or relationships of the entitymetadatadetail 940 class based on changes in context. The attribute changes can be used to constrain which MetaData should be aggregated by which Entity. Note that the contextselectsmgmtpolicyrules aggregation 927 can be used to select the specific set of ManagementPolicyRules 924 that are appropriate for a particular context. FIG. 10 depicts a simplified view of how virtual and non-virtual (i.e., physical) resources are modeled in DEN-ng. This is advantageous, as it enables the load balancing solution described in this disclosure to be applied to physical, virtual or a combination of resources. The ManageableEntity depicted in FIG. 10 defines the concept of an Entity that is manageable using digital mechanisms (e.g., using a protocol). Note that an Entity can be anything of interest to the managed environment that has its own distinct lifespan, such as a network device, a load balancer, a protocol, metric data, and the like. The ProducerConsumerAspect depicted in FIG. 10 defines the concept of a ManageableEntity that can produce and/or consume Resources and/or Services. The Resource tree defines Resources that act as an atomic and composite object via ResourceAtomic and ResourceComposite, respectively, along with a ResourceManagement class, which is used to define how Resources are managed. ResourceAtomic defines virtual and non-virtual resources. Other elements depicted on the left side of FIG. 10 provide examples of non-virtual Resources. Elements on the right side of FIG. 10 models the concept of networks implemented as a Cloud. The composite pattern is again used to represent atomic and composite Clouds.

Figure 11:
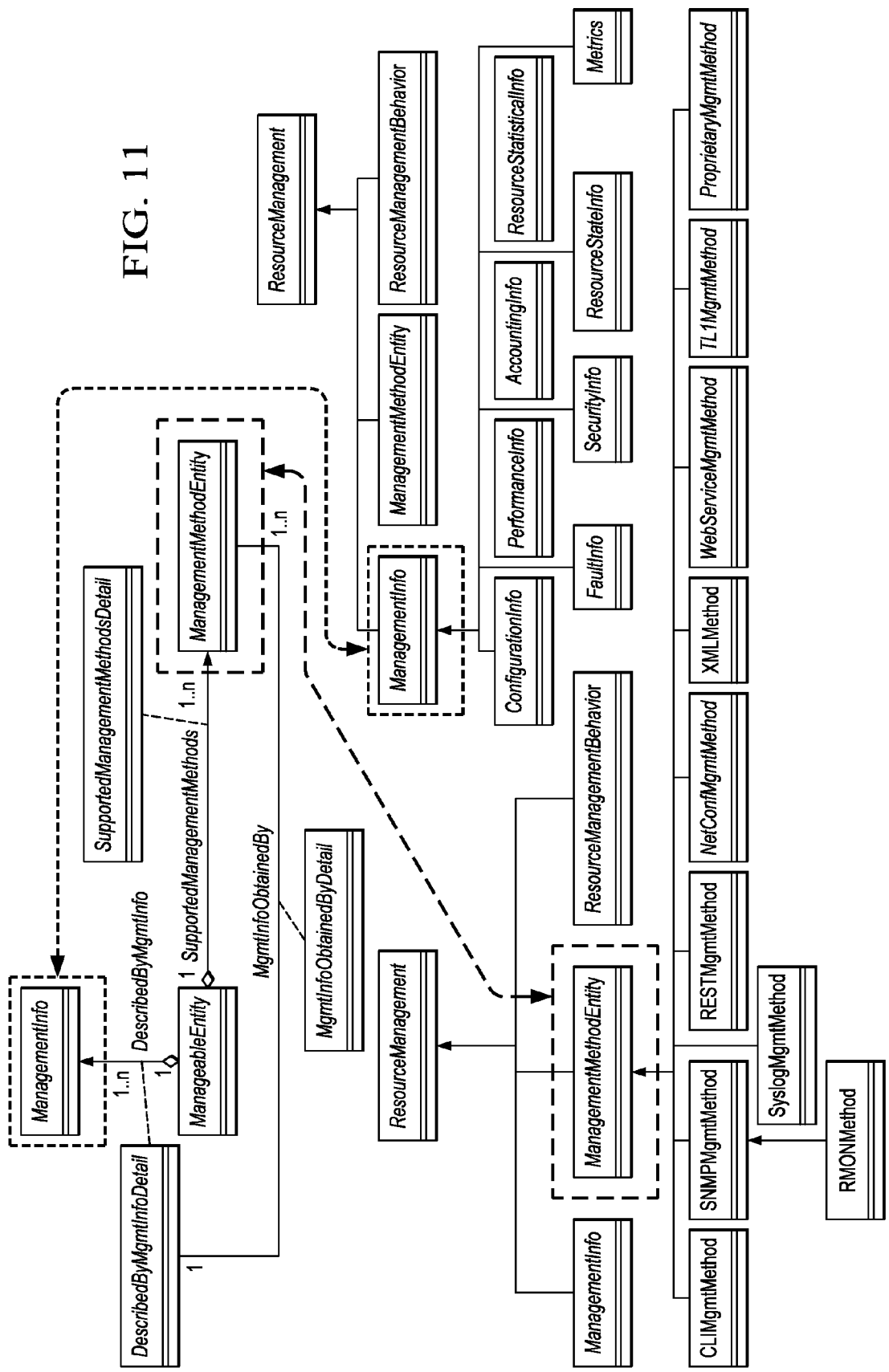
FIG. 11 illustrates a diagram for retrieving metrics from an embodiment load balancing network.

FIG. 11 shows how different types of metric data can be retrieved using one or more methods. This enables this disclosure to use software patterns to standardize how different types of metric data are collected. The classes in the top-left of FIG. 11 (e.g., ManagementInfo, SupportedManagementMethodsDetail, ManagementMethodEntity, ManageableEntity, and DescribedByMgmtInfoDetail) collectively define a software pattern that enables a ManageableEntity to select the set of management protocols (represented by the ManagementMethodEntity class) that are used to get and set OAMP data (represented by the ManagementInfo class).

The ManagementMethodEntity class is repeated in the set of classes that are subclassed from the ResourceManagement class. This set of subclasses represent different types of protocols that can be used to get and set OAMP data. The ManagementInfo class is repeated on the right side of FIG. 11 (as a subclass of ResourceManagement); its subclasses represents different types of OAMP data that can be collected by an embodiment of this disclosure.

Figure 12:
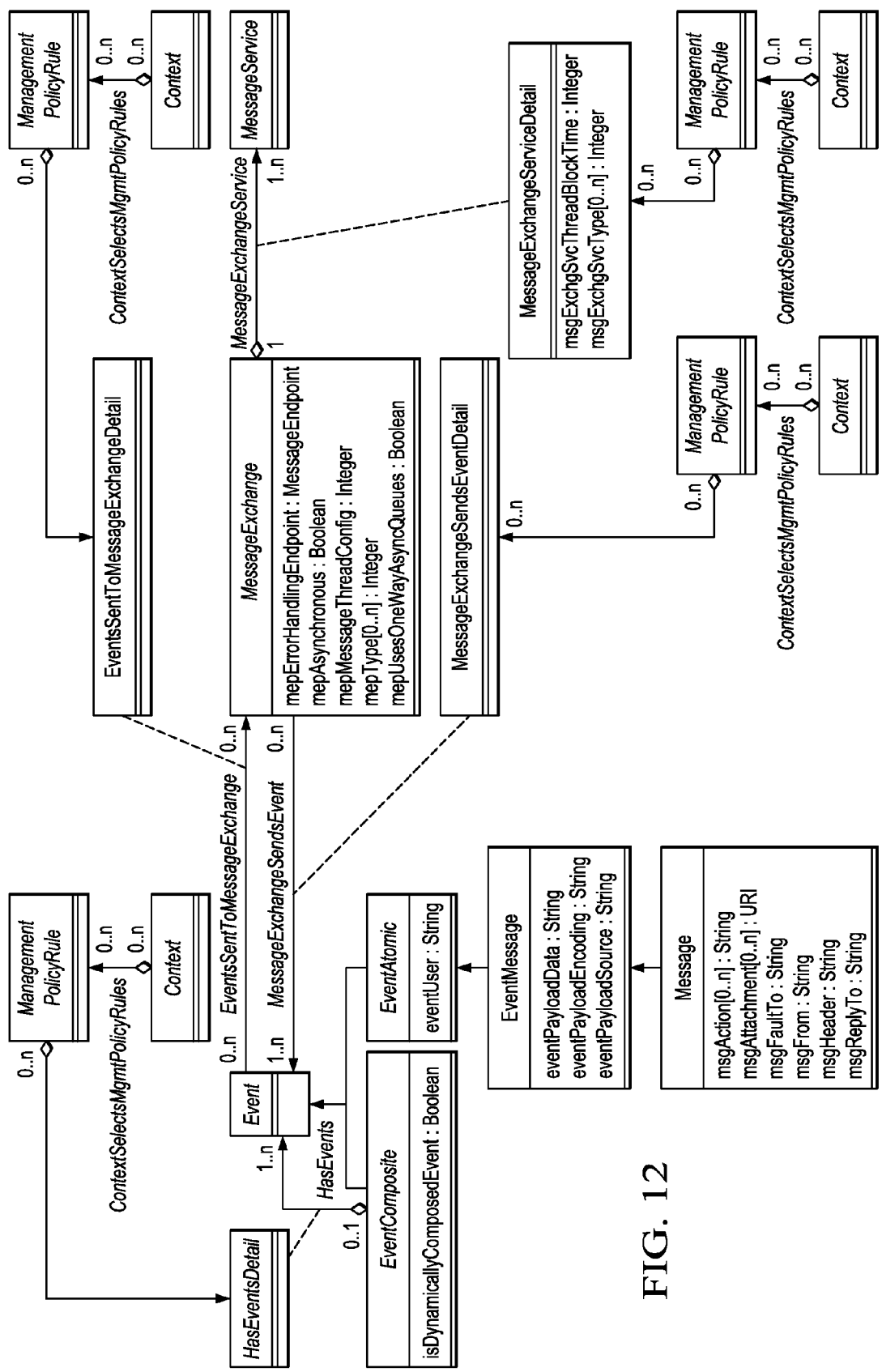
FIG. 12 illustrates a diagram for event interaction with a messaging system.

FIG. 12 describes how an event-based system interacts with a messaging system, such as one that can be used with a load balancer that is conformant with this disclosure. FIG. 12 represents how different types of Events are sent and received by a messaging system, and how context-aware policy rules (described above) can be used to control the behavior of which messages are sent, received, and operated on by the messaging system. The left side of FIG. 12 shows the composite pattern applied to the Event class, producing EventComposite and EventAtomic subclasses, which are used to represent compound and simple Events, respectively. The EventMessage class refines the concept of an Event-Message to include a payload, and a Message class refines the concept of an EventMessage to include additional fields that facilitate the routing of the Event and its payload. The EventComposite class defines one attribute, which signifies if the EventComposite is artificial (i.e., composed by this embodiment) or not.

The middle and right of FIG. 11 contains the Message-Exchange and MessageService classes. These two classes represent the concept of a messaging service that uses context-aware policy rules to control which messages are sent to which ManageableEntities. This is done using a common pattern, called the Policy Pattern, in DEN-ng. Note the presence of four repeated instances of the Context, ManagementPolicyRule, and ContextSelectsMgmtPolicyRules aggregation. In each case, the ManagementPolicyRule is the source of an aggregation; in each case, the destination is an association class (HasEventsDetail, EventsSentToMessage-ExchangeDetail, MessageExchangeServiceDetail, and MessageExchangeSendsEvent. These four association classes control the semantics of their respective aggregations and associations in the same manner described previously. Hence, in each of these four cases, Context is used to select the appropriate set of ManagementPolicyRules to control one aspect of the embodiment of this invention. Specifically, the HasEventsDetail association class controls which Events as a function of context; the EventsSentToMessageExchangeDetail association class defines which Events generated by the system should be sent to a ManageableEntity using the messaging service as a function of context; the MessageExchangeSendEvent association class defines which Events are published to the system being managed as a function of context; the MessageExchangeServiceDetail defines which Events received by the messaging system require further processing (e.g., correlation) before they are sent to the system being managed.

Figure 13:
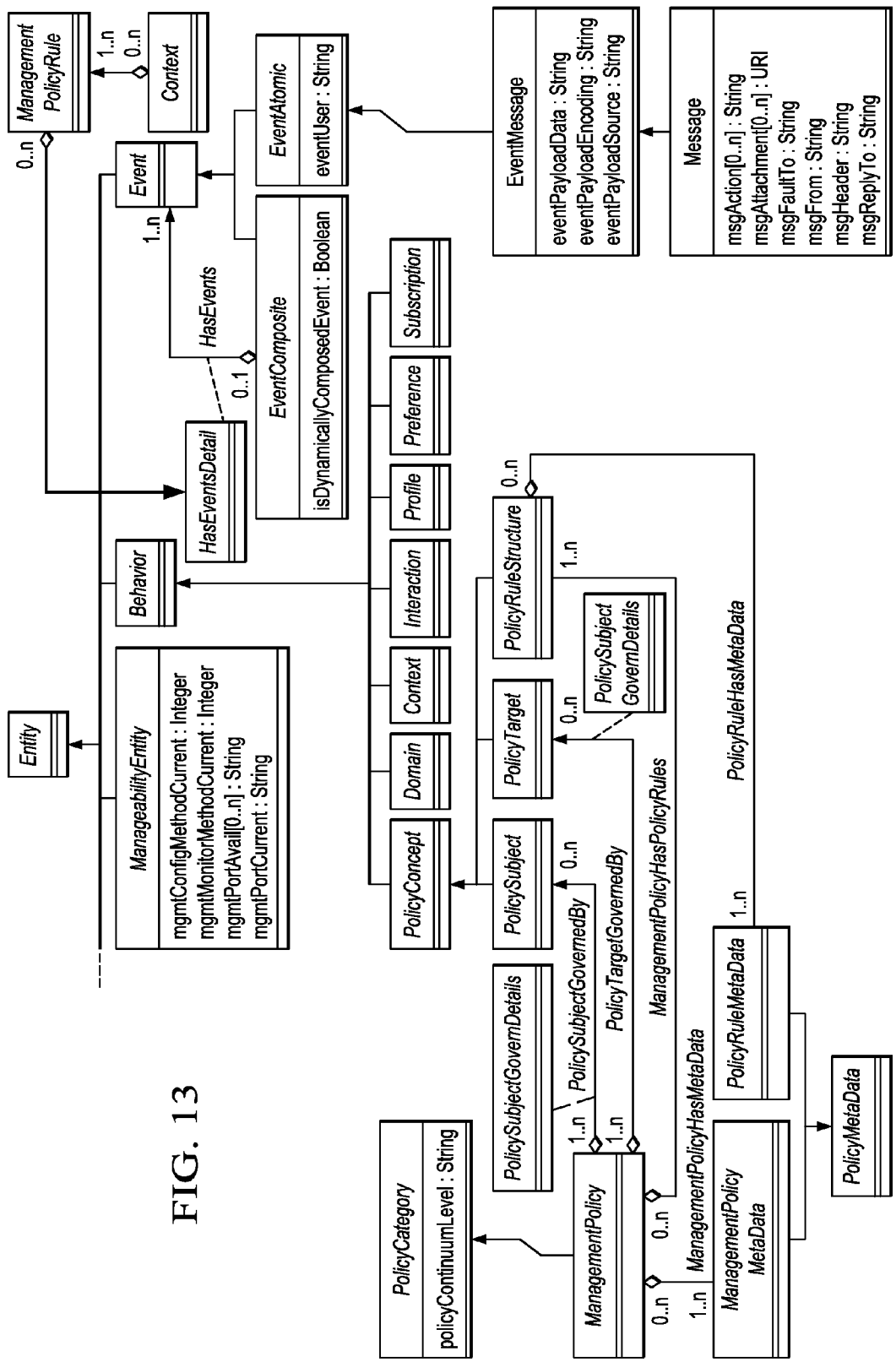
FIG. 13 illustrates a diagram for behavior based event management system.

FIG. 13 shows an embodiment DEN-ng information model that illustrates how behavior can be managed using the DEN-ng information model. The Behavior class has a number of different subclasses.

PolicyConcept is the head of the Policy class model tree. A PolicySubject is the set of entities (human or non-human) that are responsible for this Policy Rule, and a PolicyTarget is the set of entities that this Policy Rule should be applied to. For example, an administrator could be a PolicySubject, and decide that a set of Policy Rules that define how the load balancer should operate should be sent to a subset (but not all) of the current load balancers in use.

PolicyRuleStructure is the superclass of different types of Policy Rules. The most common type is an "Event-Condition-Action" rule, which has the following semantics: "WHEN an Event occurs, IF the condition clause is TRUE, then execute the actions in the action clause."

A ManagementPolicy aggregates one or more PolicySubjects, one or more PolicyTargets, and one or more PolicyRules. MetaData (i.e., data that can describe as well as prescribe behavior) can be attached to any of these model elements; special subclasses of MetaData have been defined in DEN-ng to do this for different types of model elements of the Policy model tree shown in this figure. Note that the Policy Pattern can be applied uniformly to all association classes in the DEN-ng model.

FIG. 14 presents, in tabular form, a comparison against five exemplar solutions in the market today. The embodiment described in this disclosure (i.e., the rightmost column) shows that it can support load balancing for all 16 different features; in stark contrast, the best any of the current solutions can do is to support 7 of the 16 features listed.

More importantly, the bottom four features are essential for supporting context awareness. The first of these (row 13) enables the load-balancing algorithm to be changed dynamically at runtime. The second of these (row 14) enables policy rules to be used to dynamically change the metrics that are being monitored (e.g., in response to changing context). Note that DEN-ng supports dynamically constructing policy rules, so this is even more powerful (but beyond the scope of this disclosure). The third of these (row 15) enables the health of any node (e.g., a network device being load balanced, as well as the load balancer itself) to be monitored by policy rules; this creates a closed control loop, which can be used to not only change which metric data are being monitored, but concurrently, the health of the nodes supplying and/or processing the metric data can also be defined. The final row (row 16) is perhaps the most important of all, as it enables the definition of which metric data to be retrieved at any given time to be changed. Notably, this includes the ability to change the definition of existing metrics as well as add new metrics, increasing the extensibility of this embodiment.

Figure 15:
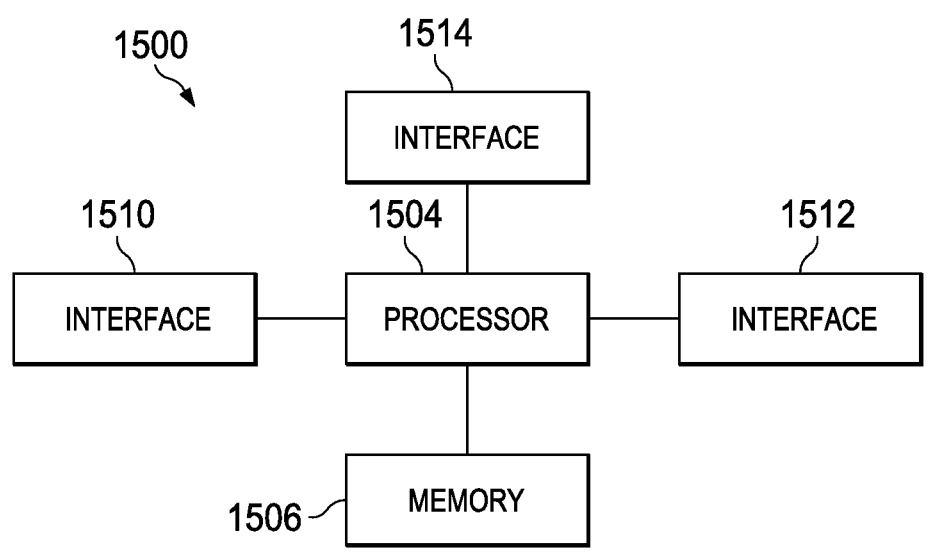
FIG. 15 illustrates a diagram of an embodiment device for performing techniques of this disclosure.

FIG. 15 illustrates a block diagram of an embodiment device 1500, which may be configured to perform load balancing techniques described herein. The device 1500 includes a processor 1504, a memory 1506, and a plurality of interfaces 1510, 1512, 1514, which may (or may not) be arranged as shown in FIG. 15. The processor 1504 may be any component capable of performing computations and/or other processing related tasks, and the memory 1506 may be any component capable of storing programming and/or instructions for the processor 1504. The interfaces 1510, 1512, 1514 may be any components or collections of components that allow the device 1500 to communicate with other network devices.

Although the description has been described in detail, it should be understood that various changes, substitutions and alterations can be made without departing from the spirit and scope of this disclosure as defined by the appended claims. Moreover, the scope of the disclosure is not intended to be limited to the particular embodiments described herein, as one of ordinary skill in the art will readily appreciate from this disclosure that processes, machines, manufacture, compositions of matter, means, methods, or steps, presently existing or later to be developed, may perform substantially the same function or achieve substantially the same result as the corresponding embodiments described herein. Accordingly, the appended claims are intended to include within their scope such processes, machines, manufacture, compositions of matter, means, methods, or steps.

What is claimed:
1. A method for dynamically adjusting load balancing behavior, the method comprising:
   instructing load-balancers to distribute service requests amongst a plurality of network elements in accordance with an initial set of policies during a first period;
   obtaining operations, administration, maintenance, and provisioning (OAMP) data generated during the first period;
   obtaining an updated set of policies in accordance with the OAMP data collected, the updated set of policies reflecting the nature of the OAMP data collected, wherein obtaining the updated set of policies comprises retrieving the OAMP data, examining the OAMP data to detect statistics and trends, and selecting the updated set of policies from a pool of policies in accordance with the statistics and trends; and
   instructing the load-balancers to distribute service requests amongst the network elements in accordance with the updated set of policies during a second period.

2. The method of claim 1, wherein the initial set of policies are selected from a pool of policies stored in a rule repository of a load-balancing network.

3. The method of claim 1, where obtaining the updated set of policies in accordance with the OAMP data comprises:
   selecting a set of pre-defined policies from a pool of policies; and
   modifying the set of pre-defined policies in accordance with the OAMP data to obtain the updated set of policies.

4. The method of claim 1, wherein obtaining the updated set of policies in accordance with the OAMP data comprises:
creating at least one new policy in accordance with the OAMP data, wherein the at least one new policy is included in the updated set of policies.

5. The method of claim 1, wherein the load balancers remain in continuous runtime operation from the beginning of the first period to the end of the second period.

6. The method of claim 1, wherein the OAMP data is generated by the network elements.

7. The method of claim 1, wherein the OAMP data is generated by the load balancers.

8. The method of claim 1, wherein the OAMP data is generated by the network elements and the load balancers.

9. The method of claim 1, wherein the load balancers are positioned in-between a distribution server and the network elements that are being load-balanced.

10. The method of claim 9, wherein the distribution server is configured to distribute the service requests amongst the load balancers, and wherein the load balancers are configured to distribute the service requests amongst the network elements.

11. The method of claim 1, wherein the updated set of policies include load-balancing policies for operating the load balancers as well as service request distribution policies for distributing service requests to the network elements.

12. The method of claim 11, wherein the updated set of policies includes at least one service request distribution policy that is excluded from the initial set of policies.

13. The method of claim 11, wherein the updated set of policies includes at least one load balancing policy that is excluded from the initial set of policies.

14. A method for dynamically adjusting load balancing behavior, the method comprising:
instructing load-balancers to distribute service requests amongst a plurality of network elements in accordance with an initial set of policies during a first period;
obtaining operations, administration, maintenance, and provisioning (OAMP) data generated during the first period;
obtaining an updated set of policies in accordance with the OAMP data collected, the updated set of policies reflecting the nature of the OAMP data collected, wherein obtaining the updated set of policies in accordance with the OAMP data comprises calculating workloads for the network elements in accordance with OAMP data, identifying, in accordance with the workloads, at least one overworked network element, and obtaining a policy that at least partially reduces the workload of the overworked network element, wherein the obtained policy is included in the updated set of policies; and
instructing the load-balancers to distribute service requests amongst the network elements in accordance with the updated set of policies during a second period.

15. A method for dynamically adjusting load balancing behavior, the method comprising:
instructing load-balancers to distribute service requests amongst a plurality of network elements in accordance with an initial set of policies during a first period;
obtaining operations, administration, maintenance, and provisioning (OAMP) data generated during the first period;
obtaining an updated set of policies in accordance with the OAMP data collected, the updated set of policies reflecting the nature of the OAMP data collected, wherein obtaining the updated set of policies in accordance with the OAMP data comprises calculating a workload of a load balancer in accordance with OAMP data, determining, in accordance with the workload, that the load balancer was overworked during the first period, and obtaining a first policy that at least partially reduces the workload of the load balancer, wherein the first policy is included in the updated set of policies; and
instructing the load-balancers to distribute service requests amongst the network elements in accordance with the updated set of policies during a second period.

16. The method of claim 15, wherein obtaining the updated set of policies further comprises:
calculating workloads for the network elements in accordance with OAMP data;
identifying, in accordance with the calculated workloads, at least one overworked network element; and
obtaining a second policy that at least partially reduces the workload of the overworked network element, wherein both the first policy and the second policy are included in the updated set of policies.

17. A load-balancing network comprising:
a rule repository storing a pool of load-balancing policies, the rule repository including a physical storage medium;
a plurality of load-balancers that distribute service requests amongst network elements in accordance with an initial set of load-balancing policies during a first period, the initial set of load-balancing policies including load-balancing policies selected from the pool of load-balancing policies stored in the rule repository, the load balancers including physical processing hardware; and
a context-aware policy manager that dynamically updates the initial set of load-balancing policies in accordance with operations, administration, maintenance, and provisioning (OAMP) data generated by the load balancers, the network elements, or both during the first period, wherein the context-aware policy manager is configured to dynamically update the initial set of load balancing policies by retrieving the OAMP data, examining the OAMP data to detect statistics and trends, and selecting the updated set of policies from a pool of policies in accordance with the statistics and trends.

18. The load-balancing network of claim 17, wherein the plurality of load-balancers distribute service requests amongst network elements in accordance with the updated set of load-balancing policies during a second period that follows the first period, and wherein the load-balancing network remains in continuous runtime operation from the beginning of the first period to the end of the second period.

19. The load-balancing network of claim 17, wherein the updated set of load-balancing policies include at least one load-balancing policy that is excluded from the initial set of load-balancing policies.

20. The load-balancing network of claim 17, wherein the initial set of load-balancing policies include at least one load-balancing policy that is excluded from the updated set of load-balancing policies.

21. The load-balancing network of claim 17, wherein a first set of OAMP data is generated by the network elements that are being load-balanced during the first period.

22. The load-balancing network of claim 17, wherein a second set of OAMP data is generated by the network elements of the load-balancing network during the first period.

23. The load-balancing network of claim 17, wherein the load-balancing network comprises a distribution server and a plurality of load balancers positioned in-between the distribution server and the network elements that are being load-balanced.

24. The load-balancing network of claim 23, wherein the distribution server distributes the service requests amongst the load balancers, and wherein the load balancers distribute the service requests amongst the network elements.

25. The load-balancing network of claim 23, wherein the pool of load-balancing policies include load-balancing policies for operating the load balancers and policies to balance the work performed by each network element that each load balancer is connected to.

26. An apparatus comprising:
a processor; and
a non-transitory computer readable storage medium storing programming for execution by the processor, the programming including instructions to:
instruct load-balancers to distribute service requests amongst a plurality of network elements in accordance with an initial set of policies during a first period;
obtain operations, administration, maintenance, and provisioning (OAMP) data generated during the first period;
obtain an updated set of policies in accordance with the OAMP data, wherein the instructions to obtain the updated set of policies in accordance with the OAMP data include instructions to retrieve the OAMP data, to examine the OAMP data to detect statistics and trends, and to select the updated set of policies from a pool of policies in accordance with the statistics and trends; and
instruct the load-balancers to distribute service requests amongst the network elements in accordance with the updated set of policies during a second period.

27. The apparatus of claim 26, wherein the load-balancers are configured to remain in continuous runtime operation from the beginning of the first period to the end of the second period.

* * * * *